Sept. 10, 1968   R. D. McINTYRE ETAL   3,400,972

VEHICLE WINDSHIELD HAVING INTEGRAL SUN SHIELD

Filed March 15, 1967

R. DAVID McINTYRE
FRED W. WOODWARD
INVENTORS

BY John R. Faulkner
E. Dennis O'Connor

ATTORNEYS

United States Patent Office 3,400,972
Patented Sept. 10, 1968

3,400,972
VEHICLE WINDSHIELD HAVING INTEGRAL SUN SHIELD
Raymond David McIntyre and Fred W. Woodward, Livonia, Mich., assignors to Ford Motor Company, Dearborn, Mich., a corporation of Delaware
Filed Mar. 15, 1967, Ser. No. 623,388
6 Claims. (Cl. 296—97)

ABSTRACT OF THE DISCLOSURE

A vehicle windshield having its upper portion coated with a light sensitive photochromic material. A light grating, coextensive with the photochromic material and located exteriorly of the latter, allows forward visibility to a predetermined extent and allows only rays of the sun that would blind the eyes of the vehicle operator or front seat passenger to impinge upon the photochromic material.

Background of the invention

Vehicle design studies have shown that the front seat "eye position area," that is, the area of a vehicle interior in which the vast majority of vehicle operators and front seat passengers regardless of their physical dimensions will have their eyes positioned, is a relatively small area of the vehicle interior. This eye position area is particularly limited in magnitude in vehicles having stationary seats and movable operating controls. These findings have enabled vehicle designers to contemplate stationary sun shields integral with the vehicle windshield in place of the movable sun visors currently in use in motor vehicles.

One difficulty with integral sun shields is the requirement that the sun shields not restrict the field of vision of the vehicle operator during periods when the shields are not needed to protect the operator's eyes from direct sunlight. This invention provides a vehicle windshield having a stationary, integral sun shield that remains transparent to the eyes of front seat occupants until direct sunlight bears on the sun shield in such a manner that the sunlight is directed towards the above-mentioned eye position area. Upon such an occurrence, the sun shield becomes opaque.

Brief summary of the invention

The windshield of this invention is particularly adapted for utilization in a motor vehicle body having an opaque roof panel and a cowl and extends between these members to partially define the vehicle passenger compartment. The windshield includes a transparent panel having normally transparent photochromic dye overlying the portion of said panel adjacent the roof panel. The photochromic dye becomes opaque when impinged upon by non-ambient light such as direct sunlight. Light grating means, coextensive with the photochromic dye are positioned adjacent the transparent panel to permit a desired degree of forward visibility and allow only sun rays tending to blind the vehicle operator or front seat passenger to impinge upon the photochromic dye. The light grating means are remote from the passenger compartment relative to the photochromic dye.

Detailed description of the invention

Figure 1:
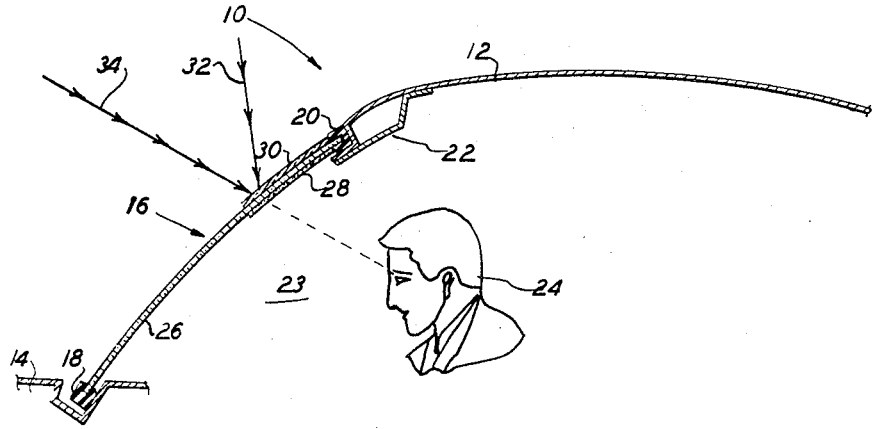
FIGURE 1 illustrates schematically a portion of a motor vehicle body, having parts in section, including a windshield constructed and arranged in accordance with this invention.
Figure 2:
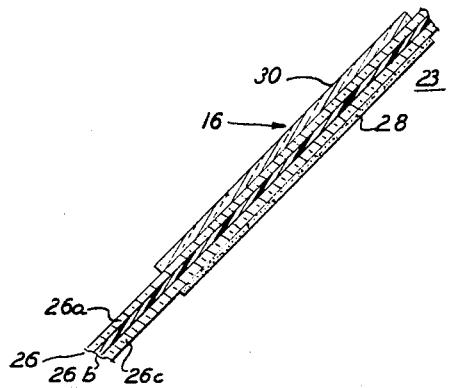
FIGURE 2 is an enlarged section view of that portion of the windshield of FIGURE 1 having an integral sun shield.

Referring now in detail to the drawings, the numeral 10 denotes generally a motor vehicle body having an opaque roof panel 12 and a cowl 14. A windshield 16 is mounted by means of a weatherstrip 18 adjacent cowl 14 and by a weatherstrip 20 carried by a header 22 adjacent roof panel 12. Windshield 16 and roof panel 12 cooperate to partially define a passenger compartment 23 in which is seated a front seat occupant 24.

Windshield 16 includes a conventional safety glass panel 26 constructed of laminar layers 26a, 26b and 26c. The inside surface of the upper portion of glass panel 26 is covered by a coating of light sensitive photochromic dye 28. Such dye is normally transparent, but when exposed to rays of non-ambient light, such as direct sunlight, the dye becomes opaque.

Coextensive with dye 28, but secured to the outside surface of glass panel 26, is a light grating film 30. Film that has been found satisfactory for the purposes of this invention is available commercially as "Solarblock." Such film is partially transparent and has a plurality of opaque portions so that it functions in a manner similar to a partially open Venetian blind, i.e., it permits the passage therethrough of light striking the film a particular angular range while blocking the passage of light striking the film at angles not included within the range. Film 30 is arranged so that it allows the passage of light directed towards the eye position area thus permitting forward visibility to a desired extent. This arrangement easily may be determined empirically.

During daylight operation of a motor vehicle including a windshield constructed in accordance with this invention, when direct sunlight would not enter the eye position area (a ray of such sunlight is identified in FIGURE 1 by the numeral 32), the sun shield is transparent to vehicle operator 24. This is because light grating film 30 blocks the passage of light ray 32 and this ray cannot impinge on photochromic dye 28. Also, since film 30 allows the passage of light directed towards the eye position area, film 30 appears transparent to occupant 24 having his eyes within the eye position area. When sunlight directed towards the eye position area and illustrated by light ray 34 impinges on windshield 16, it passes through film 30 and glass panel 26 and causes photochromic dye 28 to become opaque, thus preventing the entry of ray 34 into passenger compartment 23.

It may thus be seen that this invention provides a windshield having an integral sun shield that is transparent to a vehicle occupant until such time that unwanted sunlight would interfere with the occupant's vision. At this time the sun shield becomes opaque to block the entry of the unwanted sunlight into the vehicle interior.

It is to be understood that this invention is not limited to the exact construction illustrated and described above and that various changes and modifications may be made, such as locating both film 30 and dye 28 on one side of the glass panel 26 or locating one or both of film 30 and dye 28 between the laminar layers of glass panel 26, without departing from the spirit and scope of the invention as defined by the following claims.

We claim:
1. A panel shielding an area from rays of light comprising: a transparent member, at least a portion of said member having a coating of light sensitive photochromic material, and grating means adjacent said member permitting light impinging on said panel at a plurality of predetermined angles to pass therethrough while blocking the passage of other light through said grating, said photochromic material located proximate to said area relative to said grating means.

2. The composite panel of claim 1, wherein said grating means conforms substantially to the shape of said member and extends coextensive with said photochromic material.

3. In the motor vehicle body of claim 5, wherein said vehicle body includes an opaque roof panel, said composite window comprising a windshield abutting said roof panel, said portion of said transparent panel being proximate to said roof panel.

4. A composite sun shield window panel for a motor vehicle comprising: a transparent member, normally transparent photochromic means overlying at least a portion of said member and becoming opaque upon the impingement of non-ambient light thereupon, and grating means adjacent said member exterior of said photochromic means and permitting light impinging on said grating means within a predetermined angular range to pass therethrough while blocking the passage of light impinging on said grating means without said range.

5. In a motor vehicle body, a composite window member partially defining a passenger compartment, said composite window comprising: a transparent panel, partially opaque light grating means operatively secured to said transparent panel and permitting light impinging on said grating at a plurality of predetermined angles to pass therethrough while impeding the passage of other light through said grating, and light sensitive photochromic material operatively secured to said transparent panel, said light grating means located exterior of said photochromic material.

6. In the motor vehicle body of claim 5, wherein said light grating means extends over only a portion of said transparent panel, said photochromic material being coextensive with said light grating means.

References Cited
UNITED STATES PATENTS

| | | | |
|---|---|---|---|
| 1,678,218 | 7/1928 | Gruss | 350—160 |
| 2,710,274 | 6/1955 | Kuehl | 350—160 |
| 3,351,513 | 11/1967 | Menzer. | |

BENJAMIN HERSH, *Primary Examiner.*

L. D. MORRIS, JR., *Assistant Examiner.*